United States Patent [19]

Tsuda et al.

[11] 4,274,681

[45] Jun. 23, 1981

[54] PRESSURE CONTROL VALVE ASSEMBLY FOR A FLUID BRAKE SYSTEM

[75] Inventors: Yoshitaka Tsuda, Tokyo; Kaoru Sodeyama, Kokubunji; Naomasa Tsunada, Hachioji, all of Japan

[73] Assignee: Nissan Motor Company, Limited, Yokohama, Japan

[21] Appl. No.: 129,854

[22] Filed: Mar. 13, 1980

[30] Foreign Application Priority Data

Mar. 20, 1979 [JP] Japan .............................. 54-35927[U]

[51] Int. Cl.³ .......................................... B60T 13/00
[52] U.S. Cl. .................................. 303/6 C; 188/349; 303/22 R
[58] Field of Search .................. 303/6 C, 84 A, 84 R, 303/22 R, 22 A; 188/349

[56] References Cited

U.S. PATENT DOCUMENTS 3,467,440 9/1969 Strien ................................ 188/349 X

FOREIGN PATENT DOCUMENTS 2811005 10/1978 Fed. Rep. of Germany ........... 188/349

*Primary Examiner*—Douglas C. Butler
*Attorney, Agent, or Firm*—Thompson, Birch, Gauthier & Samuels

[57] ABSTRACT

A pressure control valve assembly for a fluid brake system has a piston which rapidly strikes at its one end portion against a shock absorbing abutment member in a concavity of a housing wall section when a fluid under pressure is rapidly released from the valve assembly, thereby preventing the production of an unpleasant sound at such times.

2 Claims, 3 Drawing Figures

PRESSURE CONTROL VALVE ASSEMBLY FOR A FLUID BRAKE SYSTEM

BACKGROUND OF THE INVENTION

This invention relates to a pressure control valve assembly for automotive fluid brake systems to prevent the skidding or slipping of the rear wheels.

In order to obviate the skidding of the rear wheels of a motor vehicle, fluid brake systems have been provided with a pressure control valve assembly to reduce the ratio of rear wheel brake pressure to front wheel brake pressure during rapid deceleration. The control valve assembly comprises a differential piston slidably received in a stepped bore formed in a housing and valve means mounted in the piston. The valve means is selectively opened and closed in accordance with the movement of the piston to effect the above brake pressure control.

In this conventional pressure control valve assembly briefly described above, the piston is constructed to assume a position spaced apart from a wall section of the housing when the fluid pressure on the master cylinder side is higher than a so-called switchover point pressure. When the depression on the brake pedal is released to allow the fluid pressure on the master cylinder side to fall beyond the switchover point pressure, the piston is moved into a position where it abuttingly engages with the housing under the bias of a spring. In this instance, the rapid release of the fluid pressure from the control valve assembly results in the piston rapidly striking against the wall section of the housing, producing an unpleasant sound.

OBJECTS OF THE INVENTION

It is accordingly an object of the present invention to provide a pressure control valve assembly for an automotive split or dual circuit brake system which overcomes the foregoing drawback inherent in the conventional pressure control valve assembly of the described type.

It is another object of the present invention to provide a pressure control valve assembly of the above-mentioned character which is constructed to avoid producing an unpleasant striking sound even when the depression on the brake pedal is rapidly released to allow the rapid release of the fluid pressure from the pressure control valve assembly.

It is a further object of the present invention to provide a pressure control valve assembly of the above-mentioned character which is easy to manufacture and therefore inexpensive.

BRIEF DESCRIPTION OF THE DRAWINGS

The above and other objects and advantages of the present invention will become apparent from the following description with reference to the accompanying drawing, in which.

DESCRIPTION OF THE PREFERRED EMBODIMENT

A pressure control valve assembly for an automotive split or dual circuit brake system according to one embodiment of the invention will now be described with reference to FIG. 1.

Figure 1:
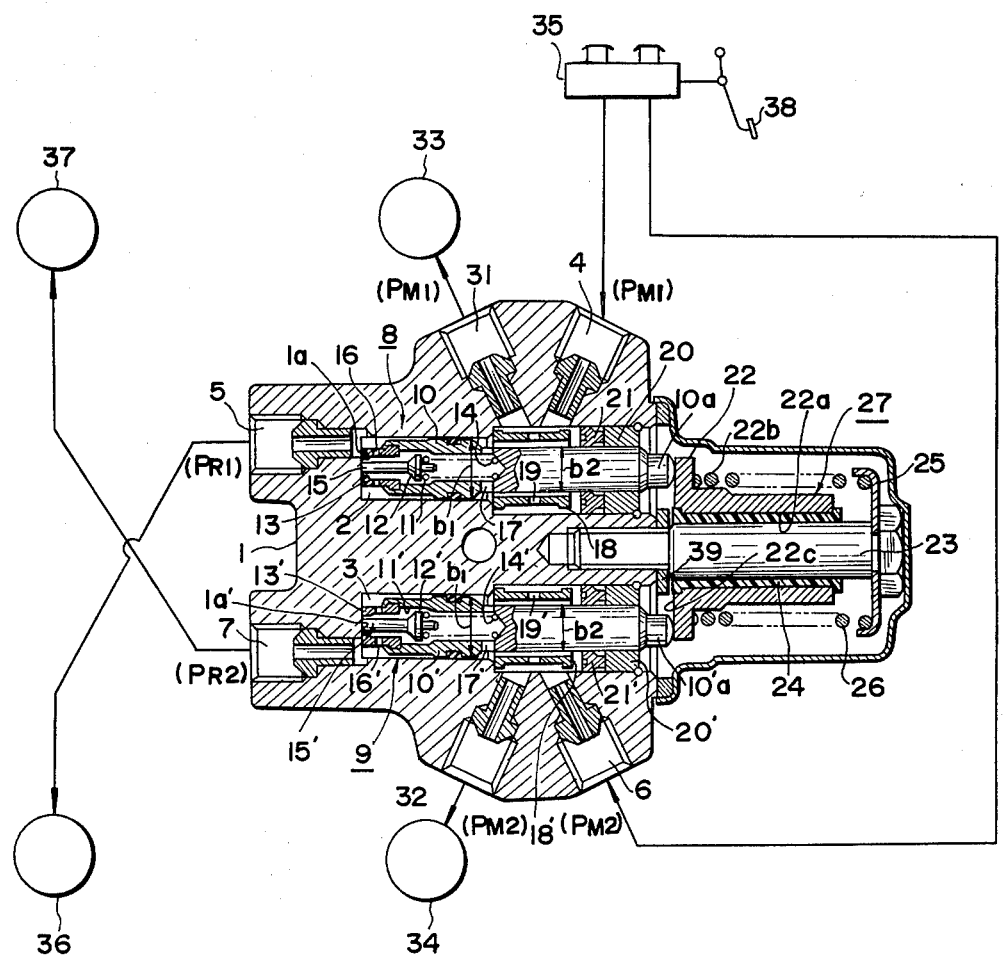
FIG. 1 is an axial cross sectional view of a pressure control valve assembly according to the present invention, with the remaining parts of the brake system shown only diagramatically.

In FIG. 1, reference numeral 1 designates a housing formed with a pair of parallel stepped bores 2 and 3 each having an open end located at one end of the housing 1. The housing 1 is also formed with a first pair of inlet 4 and outlet 5 openings communicating with the bore 2, and a second pair of inlet 6 and outlet 7 openings communicating with the bore 3. Disposed in the stepped bores 2 and 3, respectively are first and second control valve units 8 and 9 which selectively establish and interrupt communication between the inlets 4 and 6 and the outlets 5 and 7, respectively.

The control valve units 8 and 9 are of identical structure, so only unit 8 will be explained hereinafter for brevity. Reference numeral 10 designate a differential piston which is slidably received in the stepped bore 2. The piston 10 has a blind bore or a hollow section 11 in which valve means or a valve element 12 is mounted. The piston 10 also has a valve seat section 13 which is fixedly secured to the piston proper at the open end of the bore 11 and toward which the valve element 12 is biased by a spring 14.

According to this invention, the valve seat section 13 is made of an insulation or shock-absorbing material such as, for example, shock-absorbing alloy, plastic, rubber and so on.

When the piston 10 moves a predetermined distance rightwardly in the drawing, the spring 14 comes to hold the valve element 12 in its closed position. The valve element 12 has a stem 15 which is of such length as to partially protrude from the bore 11 when the valve element 12 is held in the closed position.

The valve seat 13 is formed with a radial orifice 16 providing communication between the stepped bore 2 and the blind bore 11. The piston 10 is formed with an orifice 17 providing communication between the blind bore 11 and the inlet 4. Accommodated in the stepped bore 2 is a sleeve 18 surrounding the reduced diameter portion of the piston 10 in a manner to cooperate with same to define an annular space as shown. The sleeve 18 is formed with a radial orifice 19 which cooperates with the stepped bore 2, the orifice 17, the blind bore 11 and the orifice 16 to constitute a fluid passage providing communication between the inlet 4 and the outlet 5.

The piston 10 has an end 10a protruding from the stepped bore 2 and is supported on the housing 1 near the end 10a by means of a retainer 20 fitted in the stepped bore 2. A seal member 21 is arranged to provide a fluid-tight seal between the housing 1 and the piston 10. A movable spring seat 27 is provided which consists of a seat body 22 and a bushing 24. The bushing 24 is made of resinous material and is securely fitted in the central opening 22a of the seat body 22. The guide rod 23 is fitted at the right-hand end thereof with a stationary spring seat 25. Interposed between the spring seats 25 and 27 is a compression spring 26 in a pre-loaded condition. With this arrangement, the bias of the spring 26 can be transmitted through the spring seat 27 to the pistons 10 and 10' to urge same toward their extreme positions where the valve elements 12 and 12' are kept unseated from the valve seat sections 13 and 13', i.e., in the open position thereof. The seat body 22 has an increased diameter section 22b to fittingly carry thereat the corresponding end of the spring 26. Reference 39 designates a washer which is fixedly secured to the housing 1 by means of the guide rod 23.

The housing 1 further has formed therein with a pair of outlets 31 and 32 which are in constant communication with the outlets 4 and 6 and which are connected to a brake cylinder 33 for the automotive left front wheel and a brake cylinder 34 for the automotive right front wheel, respectively. The inlets 4 and 6 are also connected respectively to the outlets of a master cylinder 35 which are in turn operatively connected to a brake pedal 38. The outlet 5 is connected to a brake cylinder 36 for the right rear wheel, whereas the outlet 7 is connected to a brake cylinder 37 for the left rear wheel.

The pressure control valve assembly for an automotive split brake system described above operates in a manner as will be hereinafter explained.

Each piston 10 or 10' has a larger pressure sensing area $b_1$ and a smaller pressure sensing area $b_2$ ($b_1 > b_2$). When the brake pedal 38 is depressed to actuate the master cylinder 35, the fluid under pressure $P_{M1}$ and $P_{M2}$ is supplied directly to the brake cylinders 33 and 34 for the left and right front wheels through the inlets 4 and 6 and the outlets 31 and 32, respectively and at the same time to the control valve units 8 and 9. Since the control valve units 8 and 9 are yet in the open position in which the valve element 12 is kept unseated from the valve section 13, the pressurized fluid passes through the passage consituted by the stepped bore 2, the orifice 17, the blind bore 11 and the orifice 16 and is delivered to the brake cylinder 36 and 37 through the outlets 5 and 7, respectively. Under the fluid pressure $P_M$ and the spring force F acting oppositely on each piston, the following equation holds, $$P_M \cdot b_2 = \tfrac{1}{2} F$$

where
$P_{M1} = P_{M2} = P_M$
$P_M = (F/2b_2)$

The fluid pressure $F/2b_2$ is called "control-starting pressure" or "switchover point pressure". The fluid pressure $P_{R1}$, $R_{R2}$ on the rear brake cylinder side is kept equal to the fluid pressure $P_{M1}$, $P_{M2}$ on the master cylinder side, that is, $P_M = P_{R1} = P_{R2} = P_R$ until the fluid pressure on the master cylinder side is increased up to the switchover point pressure.

As the operator further depresses the brake pedal until $$P_M \cdot b_2 > \tfrac{1}{2} F$$

is reached, each piston moves rightwardly in the drawing. The valve seat sections 13, 13' then abut against the valve elements 12, 12' to interrupt communication between the inlets 4, 6 and the outlets 5, 7, respectively. No fluid is thus admitted into the rear brake cylinders 36, 37. Meanwhile, the pistons 10, 10' are urged by the fluid under pressure $P_M$ in the adverse direction, i.e., leftwardly in the drawing.

Thus the equation holds, $$P_M(b_1 - b_2) + \tfrac{1}{2} F = P_R b_1 \qquad (1)$$
$$P_R = \frac{b_1 - b_2}{b_1} \cdot P_M + 2\tfrac{F}{b_1}$$

When the fluid pressure $P_M$ is further raised by further depressing the brake pedal, the piston resumes the initial position to put the valve element into the closed condition. Thus, the closed and opened conditions of the valve element 12 are repeated. The outlet side fluid pressure $P_M$ is raised at the reduced rate of $(b_1 - b_2)/b_1$ with the increase of the inlet side fluid pressure $P_M$. This is quite effective in preventing the skidding of the rear wheels.

In the event of failure of one of the dual circuit, for example, of the front brake cylinder 34, the control valve unit 9 becomes inoperative and its piston continues to assume the position depicted in the drawing. As the fluid pressure in the other circuit rises, the piston 10 moves rightwardly in the drawing together with the spring seat 27 against the action of the spring 26 as already described. The spring seat 27 slides on the guide rod 23 away from the protruded end 10'a of the piston 10' to put the valve element 12 into the closed condition. In this instance, the spring force is applied upon the piston 10 only.

Thus the equation holds, $$P_R = \frac{b_1 - b_2}{b_1} \cdot P_M + \frac{F}{b_1} \qquad (2)$$

As will be readily understood from the comparison between the equation (1) and the equation (2), only one control valve developes a large braking fluid pressure enough to compensate for the lack of braking force due to the failure of one of the dual circuit. Upon the further depression of the brake pedal 38, the fluid pressure $P_R$ on the rear brake side is gently raised at the rate of $(b_1 - b_2)/b_1$ with the increase of the fluid pressure $P_M$ on the master cylinder side. The skidding of the rear wheels can therefore be prevented similarly as in the case that the two circuits are in the correct or normal condition.

When the depression on the brake pedal 38 is removed, the fluid pressure on the master cylinder side is reduced with the movement of the brake toward its initial position. During this time when the magnitude of the fluid pressure on the master cylinder side is still larger than the foregoing switchover point pressure, the piston 10 is held in a position spaced apart from the wall section 1a. When the magnitude of the fluid pressure on the master cylinder side is further reduced beyond a predetermined value corresponding to the switchover point pressure, the piston 10 moves rightwardly in the drawing into its extreme position where it abuttingly engages at its valve seat section 13 with the wall section 1a. The piston is held in the extreme position under the bias of the spring 26. Upon this returning of the piston 10, the piston rapidly strikes against the wall section 1a if the fluid pressure on the master cylinder side falls rapidly. However, this does not result in the production of an unpleasant sound due to the seat section 13 or 13' which is made of an insulation or shock-absorbing material according to this invention.

Figure 2:
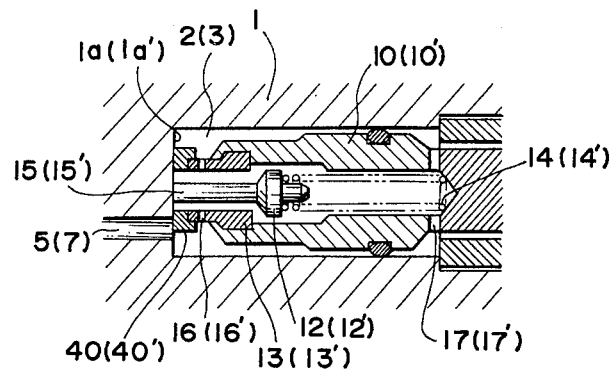
FIG. 2 is an enlarged partial view showing another embodiment of the invention.

Referring to FIG. 2, another embodiment of this invention wil be described below.

The embodiment of FIG. 2 differs from that of FIG. 1 in that each valve seat section 13 or 13' has fixedly secured thereto a stopper 40 or 40' which is made of an insulation or shock-absorbing material and which forms part of the valve seat section as an alternative to the valve seat section of FIG. 1 which is entirely made of an insulation or shock-abosrbing material. The embodiment of FIG. 2 produces substantially the same effect as that of FIG. 1.

Figure 3:
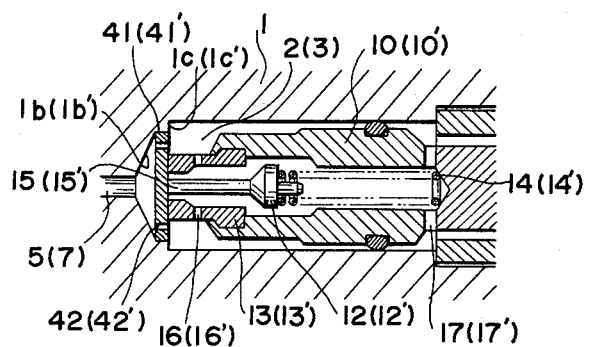
FIG. 3 is an enlarged partial view showing still another embodiment of the invention.

Referring to FIG. 3, still another embodiment of this invention will be described below.

In FIG. 3, reference numeral 1c or 1c' designates a wall section corresponding to the wall section 1a or 1a' of FIG. 1. The wall section 1c or 1c' has formed therein a concavity 1b or 1b' into which an abutment member 41 or 41' made of an insulation or shock-absorbing material and in the form of a flat plate is press-fitted or fixedly fitted to form part of the wall section 1c or 1c'. The abutment member 41 or 41' is formed with a plurality of fluid passages 42 or 42' which provide communication between the stepped bore 2 or 3 and the outlet 5 or 7. The fluid passages 42 or 42' are arranged in the radially outer portion of the abutment member so as not to be closed by the seat section 13 or 13' which abuttingly engages with the abutment member when the piston 10 or 10' is moved into its extreme position. The embodiment of FIG. 3 produces substantially the same effect as that of FIG. 1 and furthermore admits an arrangement in which the outlet 5 or 7 is axially aligned with the stepped bore 2 or 3, effecting an easy manufacture.

By the foregoing, there have been provided an improved pressure control valve assembly calculated to fulfill objects hereinabove set forth, and while preferred embodiments have been illustrated and described in detail hereinabove, various additions, substitutions, modifications and omissions may be made thereto without departing from the spirit of the invention defined by the appended claims.

What is claimed is:

1. In a pressure control valve assembly for an automotive split brake system having a master cylinder and a brake cylinder, the pressure control valve assembly comprising a housing having a stepped bore and a wall section defining part of said bore, a concavity formed in said wall section, a shock absorbing abutment member in said concavity, a differential piston within said bore, said piston being abuttingly engageable at its one end portion with said shock absorbing member upon movement into its extreme position and having a hollow section, biasing means for urging said piston into said extreme position and including a spring seat movable toward and away from said housing, and valve means mounted in the hollow section of said piston, said piston being exposed to the fluid pressures in the master cylinder and the brake cylinder and assuming a position governed by said fluid pressures for selectively opening and closing said valve means such that the rate of the pressure increases in said brake cylinder to the pressure increase in said master cylinder is increased beyond a predetermined switchover point pressure, said abutment member being formed with a fluid passage providing constant communication between said stepped bore and said concavity.

2. The pressure control valve assembly as claimed in claim 1, in which said housing further has an outlet in communication with both said brake cylinder and said concavity and in which said outlet is axially aligned with said stepped bore.

* * * * *

UNITED STATES PATENT AND TRADEMARK OFFICE
CERTIFICATE OF CORRECTION

PATENT NO. : 4,274,681

DATED : June 23, 1981

INVENTOR(S) : Yoshitaka Tsuda, Kaoru Sodeyama, Naomasa Tsunada

It is certified that error appears in the above-identified patent and that said Letters Patent are hereby corrected as shown below:

IN THE CLAIMS:

Column 6, line 23, After "cylinder", insert --is reduced when the fluid pressure in said master cylinder--.

Signed and Sealed this

Twenty-ninth Day of September 1981

[SEAL]

Attest:

GERALD J. MOSSINGHOFF

Attesting Officer

Commissioner of Patents and Trademarks